(12) United States Patent
Boyer

(10) Patent No.: US 8,141,950 B2
(45) Date of Patent: Mar. 27, 2012

(54) SINGLE RETRACTOR LOWER ANCHOR CONNECTION SYSTEM

(75) Inventor: Jason Boyer, Carmel, IN (US)

(73) Assignee: IMMI, Westfield, IN (US)

( * ) Notice: Subject to any disclaimer, the term of this patent is extended or adjusted under 35 U.S.C. 154(b) by 316 days.

(21) Appl. No.: 12/536,835

(22) Filed: Aug. 6, 2009

(65) Prior Publication Data

US 2010/0033001 A1 Feb. 11, 2010

Related U.S. Application Data

(60) Provisional application No. 61/086,906, filed on Aug. 7, 2008.

(51) Int. Cl.
*A47C 1/08* (2006.01)
(52) U.S. Cl. ............... 297/250.1; 297/253; 297/254; 297/474; 297/475; 297/479
(58) Field of Classification Search ............ 297/253, 297/250.1, 254, 474, 475, 479
See application file for complete search history.

(56) References Cited

U.S. PATENT DOCUMENTS

| | | | | |
|---|---|---|---|---|
| 5,570,932 A * | 11/1996 | Collins et al. | ............... | 297/479 |
| 5,676,398 A * | 10/1997 | Nurtsch | ............... | 280/806 |
| 6,209,957 B1 * | 4/2001 | Baloga et al. | ............... | 297/253 |
| 6,247,756 B1 * | 6/2001 | Wagner | ............... | 297/484 |
| 6,568,709 B2 * | 5/2003 | Schneider et al. | ........ | 280/801.1 |
| 6,592,183 B2 * | 7/2003 | Kain | ............... | 297/253 |
| 6,767,057 B2 * | 7/2004 | Neelis | ............... | 297/253 |
| 6,820,310 B2 * | 11/2004 | Dingman et al. | ............... | 24/171 |
| 6,832,813 B2 * | 12/2004 | Tomas et al. | ............... | 297/250.1 |
| 6,863,345 B2 * | 3/2005 | Kain | ............... | 297/256.16 |
| 6,962,394 B2 * | 11/2005 | Anthony et al. | ............... | 297/253 |
| 7,044,548 B2 * | 5/2006 | Mullen et al. | ............... | 297/253 |
| 7,278,684 B2 * | 10/2007 | Boyle | ............... | 297/253 |
| 7,467,825 B2 * | 12/2008 | Jane Santamaria | .......... | 297/253 |
| 7,488,034 B2 * | 2/2009 | Ohren et al. | ............ | 297/216.11 |
| 7,597,396 B2 | 10/2009 | Longenecker et al. | | |
| 7,726,737 B2 * | 6/2010 | Jane Santamaria | .......... | 297/253 |
| 2001/0010431 A1 * | 8/2001 | Sasaki et al. | ............... | 297/250.1 |
| 2003/0034686 A1 * | 2/2003 | Soderstrom et al. | ......... | 297/484 |
| 2004/0250387 A1 * | 12/2004 | Jones et al. | ............... | 24/633 |
| 2006/0163923 A1 * | 7/2006 | Baumann et al. | ........... | 297/254 |
| 2007/0069562 A1 * | 3/2007 | Van Montfort et al. | ...... | 297/253 |
| 2010/0019557 A1 | 1/2010 | Longenecker et al. | | |
| 2010/0253121 A1 | 10/2010 | Buckingham et al. | | |

FOREIGN PATENT DOCUMENTS

EP 560184 A1 * 9/1993

* cited by examiner

*Primary Examiner* — Laurie Cranmer
(74) *Attorney, Agent, or Firm* — Woodard, Emhardt, Moriarty, McNett & Henry LLP

(57) ABSTRACT

A lower anchor connection system for securing the child seat to vehicle anchor bites. A single retractor includes a web extendable therefrom connected to a strap having at its opposite ends couplings for lockingly engaging the anchor bights. A release button on the retractor when depressed allows the retractor web to be withdrawn holding the couplings adjacent the child seat in a stored position.

22 Claims, 10 Drawing Sheets

US 8,141,950 B2

SINGLE RETRACTOR LOWER ANCHOR CONNECTION SYSTEM

REFERENCE TO RELATED APPLICATION

This application claims the benefit of U.S. Provisional Application No. 61/086,906, filed Aug. 7, 2008 which is hereby incorporated by reference.

BACKGROUND OF THE INVENTION

The present invention relates generally to the field of connection systems for securing child seats to vehicle passenger seats.

DESCRIPTION OF THE PRIOR ART

Vehicle passenger seats include a seat bight anchor located between the passenger seat back and the passenger seat portion. The anchor bight is used for securing child seats and infant seats to the vehicle passenger seat. In the commonly owned U.S. Pat. No. 6,962,394, there is disclosed a coupling to attach a device, such as, a child or infant seat to an anchor bight. The coupling includes a rearwardly extending mouth to extend over the anchor bight with the coupling including a pivotally mounted latch that extends into the mouth to releasably engage the anchor bight when the bight is inserted into the mouth. The opposite end of the coupling is connected by a strap to the child seat. A coupling and web on each side of the child seat engage an anchor bight mounted to the vehicle on each side of the child seat.

A variety of adjusting devices are provided to tighten or loosen the straps extending between the child seat and the coupling. In certain cases, a pair of retractors are mounted to the child seat, one on each side, such as, disclosed in the commonly owned U.S. Pat. No. 7,278,684, with each retractor having a strap extendable therefrom with the distal end of each strap having a coupling, such as, the coupling disclosed in U.S. Pat. No. 6,962,394. Each retractor automatically retracts any slack in the strap thereby providing a secure connection between the child seat and the pair of anchor bights.

It is desirable from an economic standpoint to replace the pair of retractors connected to the pair of couplings by a single retractor. Disclosed herein is a single retractor lower anchor connection system that is operable to withdraw the slack in the strap attached to each coupling while at the same time allowing the user to unlock or release the retractor when the couplings are pulled away from the child seat when being coupled to the anchor bights.

A further advantage of the present invention is to prevent the couplings with strap(s) from dangling from the child seat when not connected to the anchor bights. The retractor is operable to automatically withdraw the strap(s) positioning the couplings adjacent the child seat when not connected to the anchor bights.

SUMMARY OF THE INVENTION

One embodiment of the present invention is an apparatus for securing a child seat to an anchor structure of a vehicle comprising a first coupler lockingly and releasably engageable with an anchor structure of a vehicle and a second coupler lockingly and releasably engageable with the anchor structure. A first flexible elongated component has a first end and a second opposite end attached respectively to the first coupler and the second coupler. A locking mechanism is mounted to the child seat. The locking mechanism has a second elongated member extendable therefrom and is coupled to the first elongated component to provide slack in the first elongated component allowing the first coupler and the second coupler to be moved outwardly from said child seat to lockingly engage the anchor structure. The second elongated member may be tightened to reduce the slack in the first elongated member securing the child seat to the anchor structure.

Another embodiment of the present invention is a child seat securable to the anchor structure of a vehicle comprising a child seat frame, a lower anchor flexible elongated component with a pair of opposite ends, a pair of couplers mounted to the opposite ends and positioned on opposite sides of the child seat frame and a retractor mounted to the child seat frame. The retractor has a rotatably mounted spool with a strap extendable and wrapped thereon. The strap is connected to the flexible component and when extended allows the couplers to move toward an anchor structure of the vehicle and when retracted reduces slack in the component tightening the child seat frame relative to the anchor structure.

DESCRIPTION OF THE PREFERRED EMBODIMENTS

Figure 1:
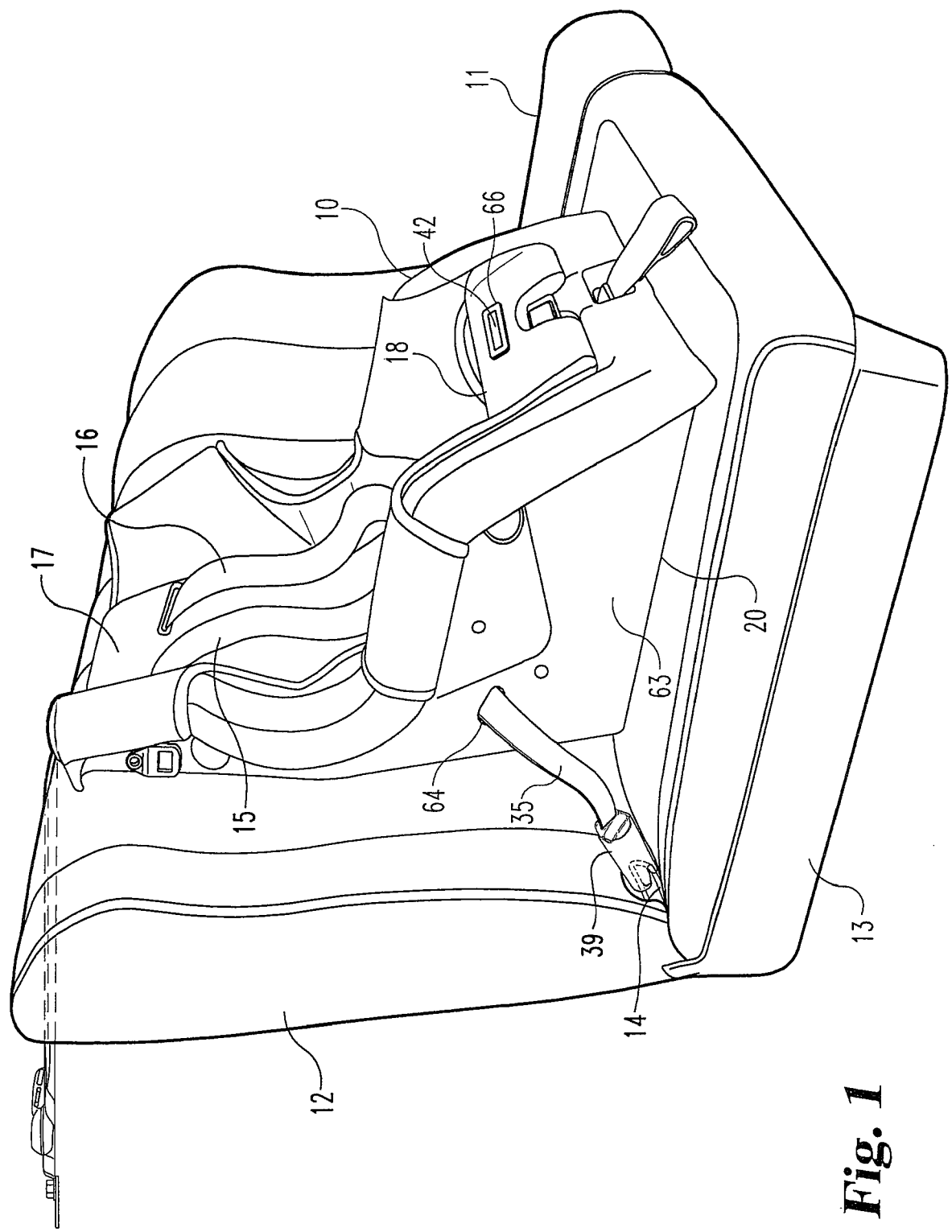
FIG. 1 is a perspective view of a forward facing child seat positioned atop a vehicle passenger seat.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
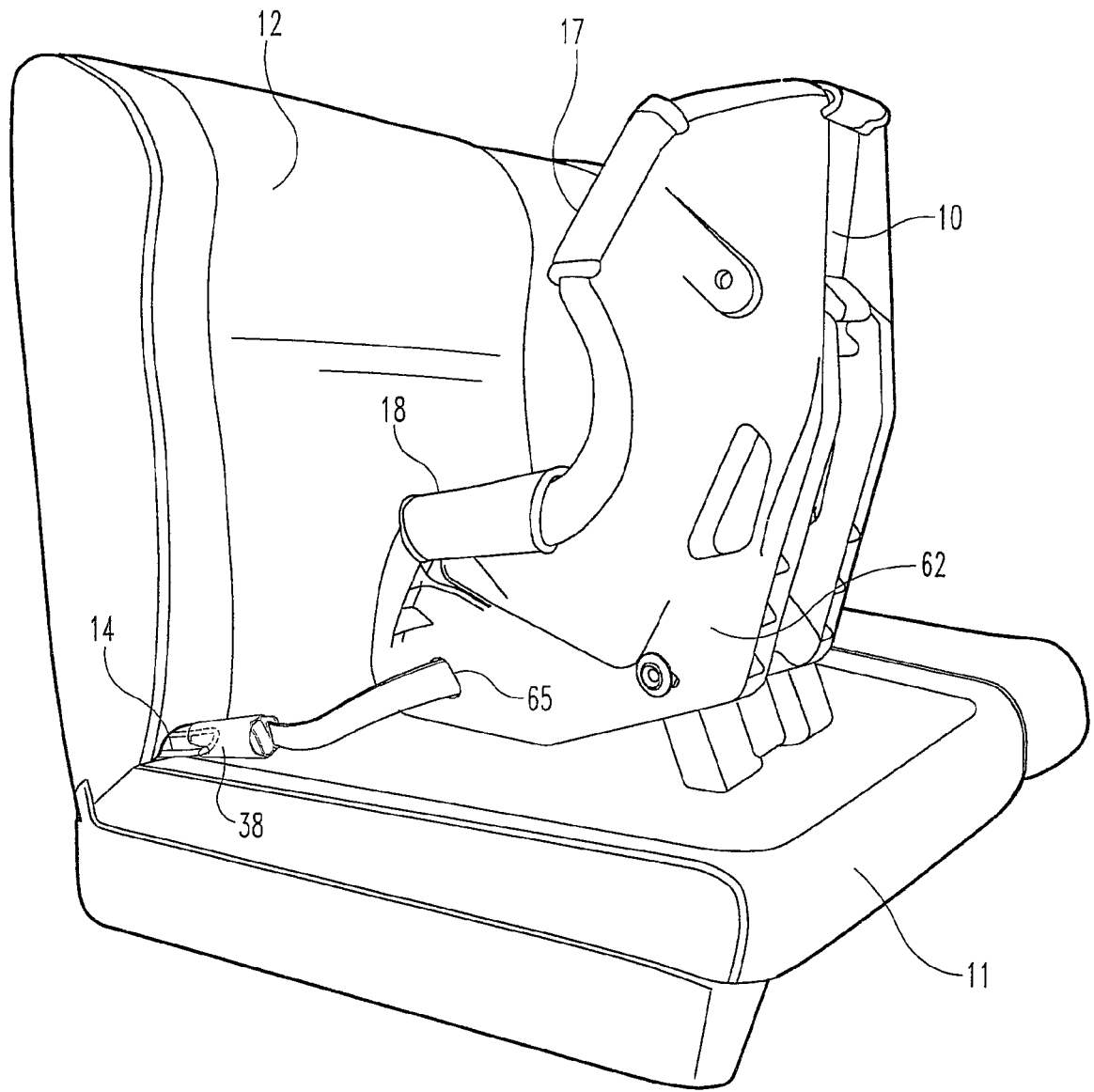
FIG. 5 is a perspective view of a rearward facing child seat positioned atop a vehicle passenger seat.

Referring now more particularly to FIG. 1, there is shown a child seat 10 mounted to a vehicle passenger seat 11. Seat 11 includes a seatback portion 12 and a seat portion 13 between which are located a plurality of anchor bights 14. Bights 14 may take the form of an inverted u-shape rod with the opposite ends fixed to the vehicle. Child seat 10 has mounted therein a single retractor lower anchor connection system for connecting the child seat by a single strap or a pair of straps having adjacent ends connected together forming a single strap having its distal ends with couplings mounted thereon releasably engageable with the anchor bights. The child seat 10 is shown as facing forward in FIG. 1; however, it is to be understood that the present invention also includes when the child seat is facing rearward as shown in FIG. 5.

A variety of conventional child seats are available for use with the single retractor lower anchor connection system disclosed herein. In the drawing, seat 10 includes a pair of restraint straps 15 and 16 extendable outwardly from the child seat back 17. A pair of conventional seatbelt tongues, not shown, are mounted respectively to straps 15 and 16 and are releasably connectable to a conventional seatbelt buckle mounted to a crotch strap, not shown, extending upwardly from the seat portion 18 of the child seat. The restraint system including straps 15 and 16 along with the seatbelt buckle and crotch strap as mounted on a child seat are commercially available.

Figure 2:
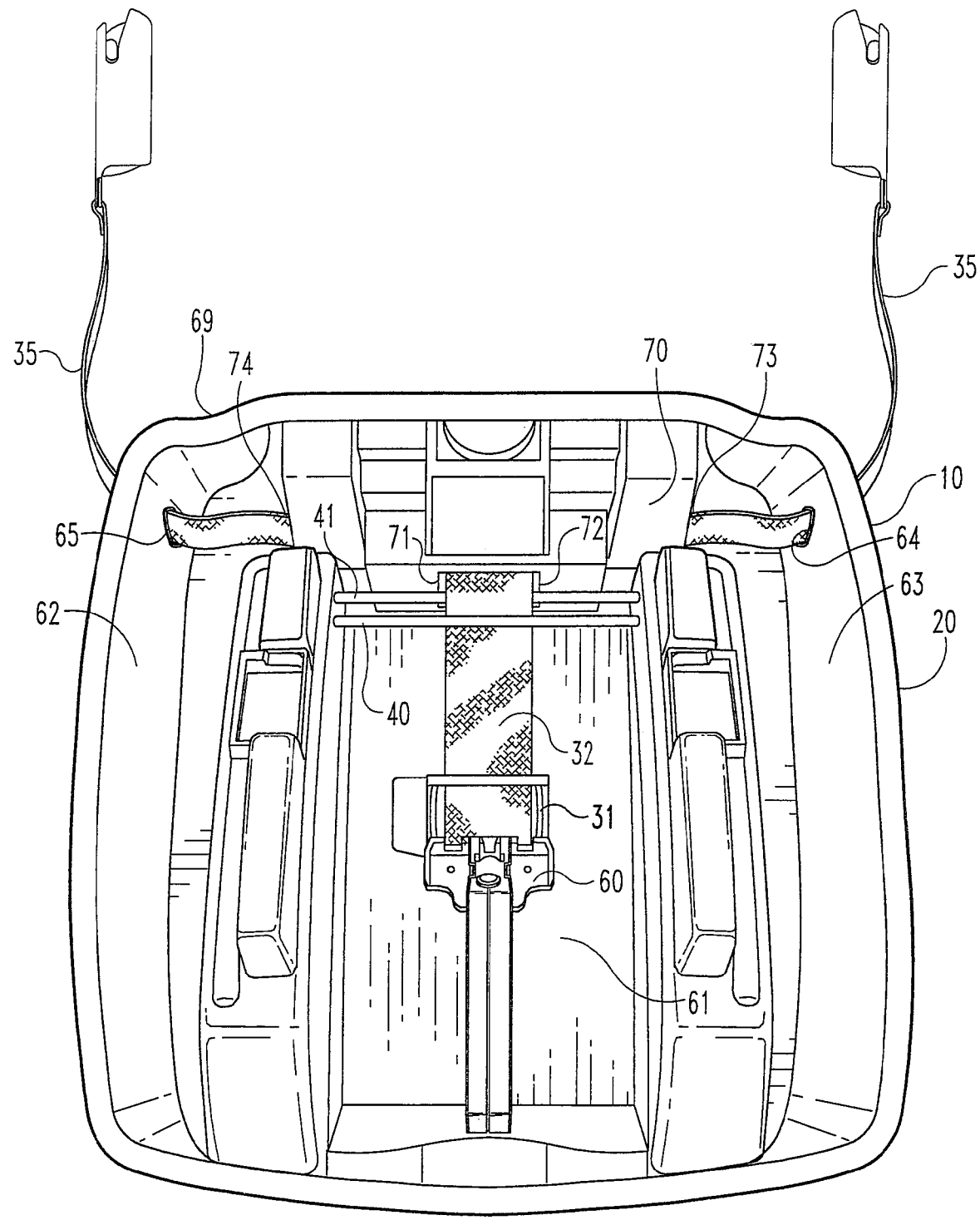
FIG. 2 is a bottom fragmented view of the child seat of FIG. 1.

FIG. 2 is a bottom view of the base 20 of child seat 10. Fixedly mounted to the base is the child retractor lower anchor connection system incorporating the present invention. More specifically, a single retractor is mounted to the child restraint shell with a web spooled onto the retractor. A lower anchor connection strap, comprising a single strap or a pair of straps connected together, is then connected to the web which is normal to the strap(s). Several embodiments are contemplated and included in the present invention. For example, the lower anchor connection strap may be connected to the web by a loop on the web (FIG. 3) with lower anchor connectors affixed on each end of the lower anchor connection strap. Another embodiment (FIG. 4) includes a lower anchor connection strap which is connected to the web by stitching. Lower anchor connectors are also affixed to the opposite ends of the strap.

Figure 3:
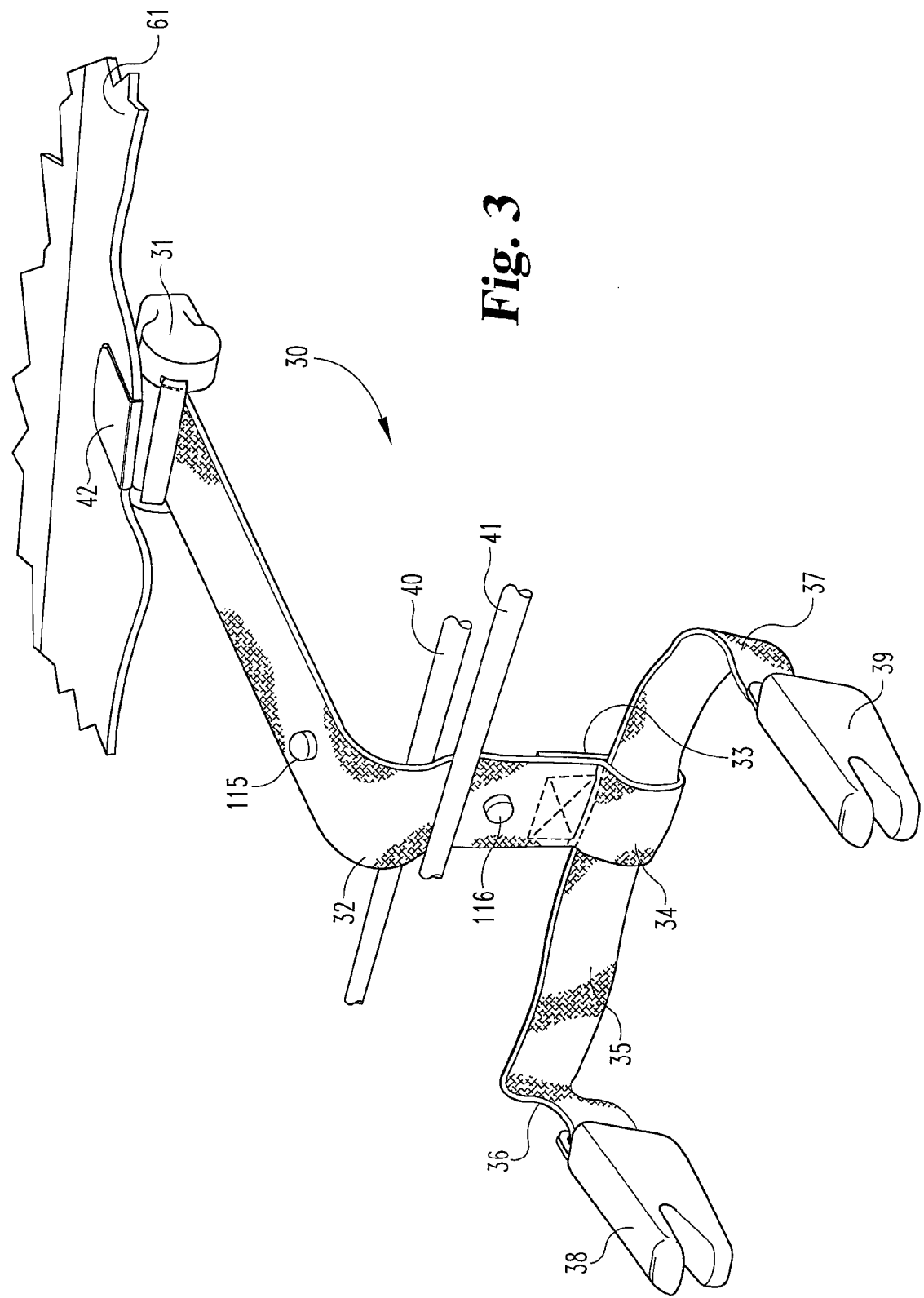
FIG. 3 is a schematic diagram of the preferred embodiment of the single retractor lower anchor connection system mounted in the child seat base as shown in FIG. 2.

Referring more specifically to FIG. 3, there is shown a schematic diagram of the preferred embodiment of the single retractor lower anchor connection system 30. System 30 includes retractor 31 fixedly mounted to a portion 61 of the child seat base. Retractor 31 includes a rotatable spool having web 32 wrapped thereon and extendable from the retractor. The spool is spring biased to normally urge the web to be retracted into the retractor but yieldable to allow the web to be pulled outwardly. The spool has opposite end flanges with ratchet teeth formed thereon to lockingly engage a spring biased pawl mounted to the retractor frame.

Figure 10:
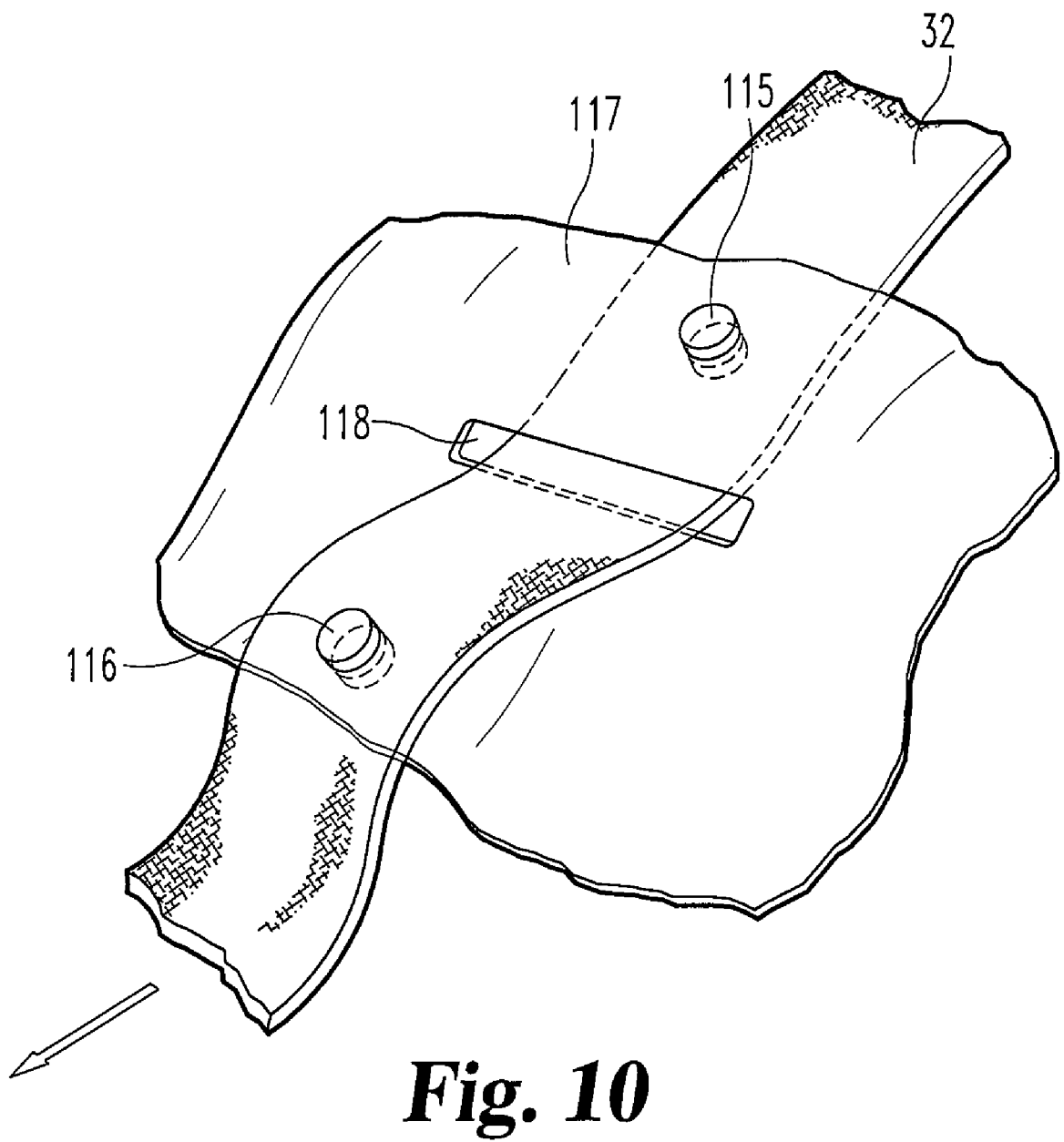
FIG. 10 is a fragmentary perspective view of a further alternate embodiment showing a slotted wall with web buttons to limit the travel of the web.

The distal end 33 of web 32 has a loop 34 secured thereto with a single strap 35 slidably mounted to loop 34. The opposite ends 36 and 37 of strap 35 have mounted thereto respectively a pair of couplings 38 and 39 with the couplings as disclosed, for example, in FIGS. 38-44 of U.S. Pat. No. 6,962,394 incorporated herein by reference. Other couplings are contemplated and included in the present invention. The slidable connection between web 32 and strap 35 allows more movement of strap 35 as one coupling is first locked to the anchor bight with the other coupling then being locked to another anchor bight. Upraised buttons 115 and 116 are mounted to web 32 on the opposite sides of rods 40 and 41. Buttons 115 and 116 contact rod 41 as web 32 moves through the gap between rods 40 and 41 with the gap being smaller than the thickness of web 32 and a button thereby limiting the amount of travel of web 32. In lieu of using rods 40 and 41, a wall 117 (FIG. 10) mounted to the child seat is provided with a slot 118 through which web 32 extends. Buttons 115 and 116 are located on opposite sides of wall 117 with slot 118 located between the buttons. The slot is sized smaller than the thickness of the web and button thereby limiting travel of web 32.

Strap 35 extends through the side walls of the child seat enabling each coupling 38 and 39 to releasably and lockably engage a pair of anchor bights 14 located on the passenger seat on the opposite sides of child seat 10. A pair of guide rods 40 and 41 have their opposite ends fixedly secured to the child seat base with web 32 being fed through the space between rods 40 and 41 thereby guiding the web downwardly to strap 35.

Retractor 31 includes a push button 42 which extends through opening 66 (FIG. 1) in seat portion 18 of the child seat. When button 42 is depressed, the button causes the pawl to move apart from the spool teeth to release or unlock the spool. Web 32 is pulled and extended from the retractor to facilitate locating couplings 38 and 39 adjacent the pair of anchor bights. Once the couplings 38 and 39 are connected to the anchor bights, the spring biased spool retracts excess webbing or slack in the web thereby making the strap 35 taut securely holding the child seat to the anchor bights while the pawl is lockingly engaged with the spool teeth preventing further extension of the web. When the child seat is not mounted to the vehicle seat, button 42 is depressed causing web 32 to be withdrawn thereby positioning couplings 38 and 39 adjacent the side walls of the child seat so the couplings and strap 35 do not dangle from the child seat. Such a retractor is disclosed in the U.S. Pat. No. 5,380,066, which is hereby incorporated by reference in its entirety.

Figure 4:
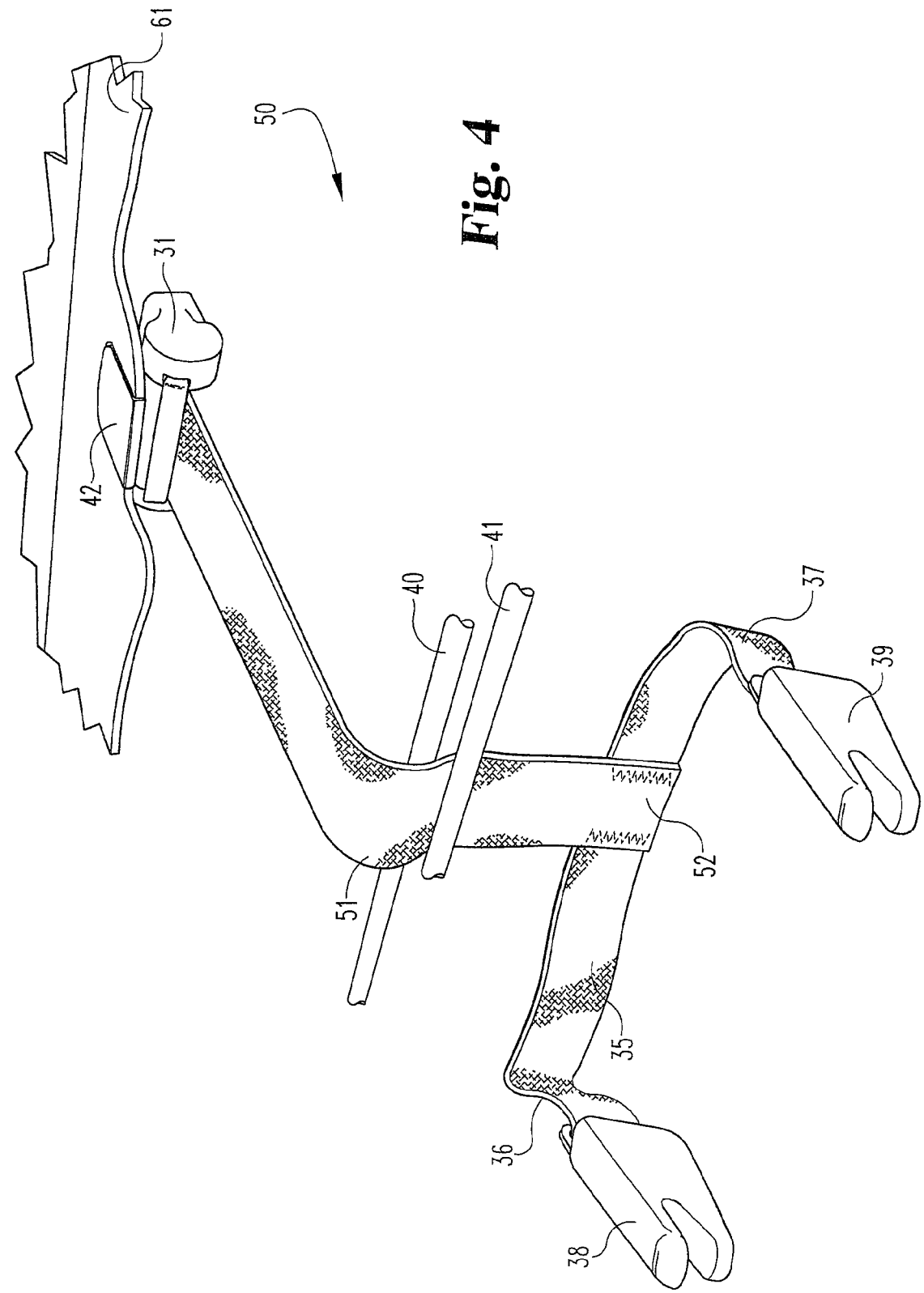
FIG. 4 is the same view as FIG. 3 only showing an alternate embodiment regarding the connection of the retractor web with the coupling strap.

Referring to FIG. 4, an alternate embodiment of a retractor lower anchor connection system is schematically depicted. The single retractor lower anchor connection system 50 includes retractor 31 previously described having a web 51 extending between guide rods 40 and 41 having their opposite ends affixed to the child seat base. The couplings 38 and 39 as previously described are connected to the opposite ends 36 and 37 of strap 35. System 50 is identical to system 30 with the exception that system 50 has the lower end 52 of web 51 fixedly attached by stitching or other suitable fastening means to generally the mid point between ends 36 and 37 of strap 35. In the event a pair of straps are used instead of single strap 35, then the adjacent ends of the pair of straps are fixedly attached to end 52 of web 51 with the couplings attached to the distal strap ends. Thus, relative motion between distal end 52 and strap 35 is prevented. Couplings 38 and 39 are attached to the anchor bights as previously described for system 30.

Referring to FIG. 2, there is shown a bottom view of the base 20 of child seat 10. The base is recessed allowing for the mounting of retractor 31 without interfering with the passenger seat portion 13 when the child seat rests there atop. Retractor 31 includes a flange 60 fixedly mounted thereto that is secured to the bottom wall 61 of child seat 10 by conventional fastening means, such as, rivets or other suitable means. Web 32 or 51 extends rearwardly on the base terminating at its distal end 33 or 52.

Cylindrical guide rods 40 and 41 are contained with the hollow interior of base 20 and have their opposite ends fixedly secured to the side walls 62 and 63 or strengthening ribs that are positioned with the hollow interior of the base and fixedly connected to bottom wall 61.

The back portion 69 (FIG. 2) of seat base 20 includes multiple walls 70 defining a hollow interior or passage 71 that extends at least partially along the child seat back 17 (FIG. 2) and down from the seat portion 18 allowing the web distal end 33 or 52 along with strap 35 to be positioned therein. Web 32 or 51 extends atop rod 40 and then downwardly between rods 40 and 41 (FIG. 2) passing through opening 72 into passage 71 in which distal end 33 or 52 along with strap 35 are located. The opposite ends 36 and 37 of strap 35 are extended through openings 73 and 74 of walls 70 and out of the recessed bottom of base 20 via slots 65 and 64 provided in the sidewalls 62 and 63 of the child seat. Connectors 38 and 39 are outwardly of the child seat and attached to the strap for engagement with the anchor bights mounted to the vehicle.

Strap 35 either extends through loop 34 as shown in FIG. 3 or is fixedly attached to distal end 52 of web 51 as illustrated in FIG. 4. Release button 42 may be depressed thereby releasing the spool on retractor 31 and allowing web 35 with the pair of couplings to be extended therefrom to engage the anchor bights. Upon release of button 42, the retractor is operable to withdraw any slack in strap 35 and web 32 and 51 while allowing the retractor pawl to lockingly engage the spool teeth thereby causing the child seat to be securely mounted and secured to the anchor bights. In the event the couplings are not connected to the anchor bights then the couplings are moved to a storage position against the side walls of the child seat. In order to release the child seat from the passenger seat, button 42 may be depressed thereby providing slack in belt 35 on both sides of the child seat and allowing the couplings to be operated and released. Continued depression of button 42 allows the retractor to withdraw the web into the retractor positioning the couplings adjacent the child seat sidewalls in a stowed position so the couplings and connected strap do not dangle from the child seat.

Many variations of the present invention are contemplated and included herein. For example, in lieu of using retractor 31 with a single web 32 (FIG. 3) or 51 (FIG. 4) extending therefrom, a single retractor 31 may be used with a pair of webs extendable therefrom that are attached to web 35 either by loops (FIG. 3) or by stitching (FIG. 4).

Figure 6:
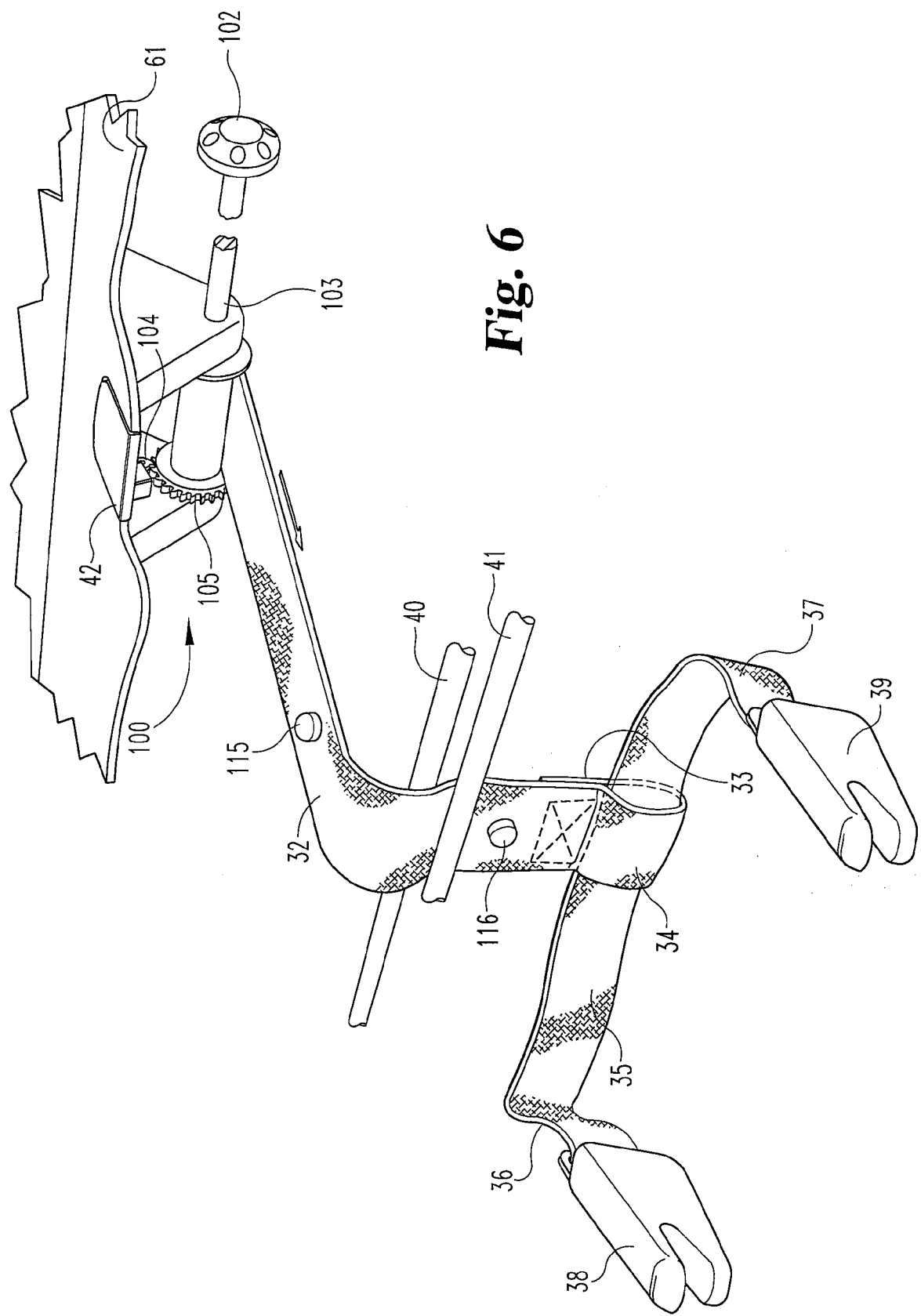
FIG. 6 is a fragmentary perspective view of an alternate embodiment utilizing a manual rotary spool in lieu of the retractor shown in FIG. 3.
Figure 7:
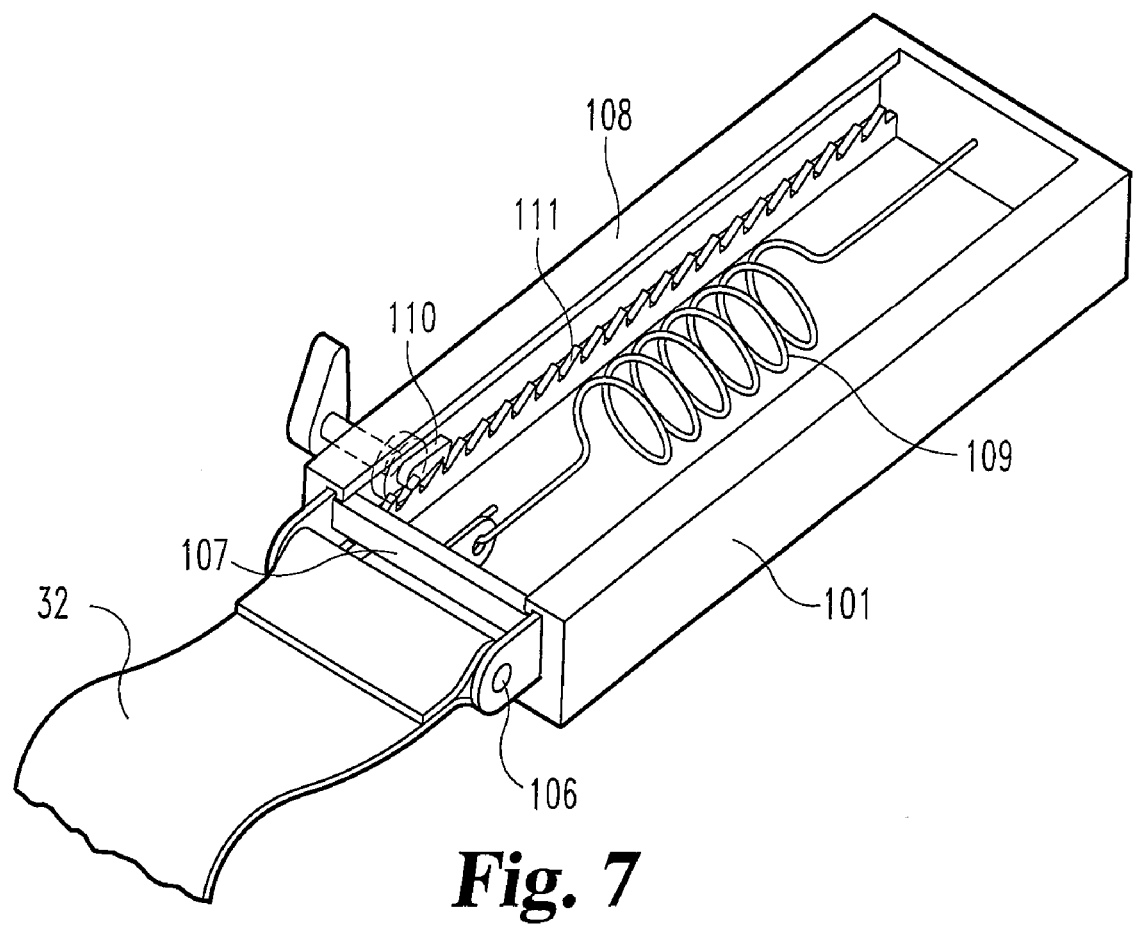
FIG. 7 is a fragmentary perspective view of a further alternate embodiment utilizing a linear adjuster in lieu of the retractor shown in FIG. 3.

Further, a manual rotatable spool 100 (FIG. 6) or a linear adjuster 101 (FIG. 7) may be used in lieu of retractor 31 with the web 32 or 51 extending from the manual rotatable spool 100 or linear adjuster 101 and connected to web 35 as described for the other embodiments described herein.

In the case of spool 100, a knob 102 is mounted to rod 103 in turn attached to a spool. Knob 102 may be rotated to retract and tighten the web 32 or 51 wound on the spool. A pawl 104 is movable to releasably lock to the teeth provided on sprocket 105 mounted to the end of the spool. Thus, pawl 104 may be manually moved apart from sprocket 105 to allow the spool to rotate and the web to be extended from the spool whereas the spool is prevented from rotating in a direction to extend the web when the pawl is engaged with the sprocket teeth.

In the case of linear adjuster 101, a spool or axle 106 having the web 32 or 51 mounted thereon is slidably mounted by U-shaped bracket 107 to a pair of opposed tracks provided in housing 108. The end of web 32 has a loop formed thereon extending around axle 106. As such, rotation of the axle does not operate to extend or retract the web. A spring 109 urges the spool and web 32 to tighten web 35. One end of spring 109 is attached to housing 108 whereas the opposite end of the spring is attached to bracket 107. Pawl 110 is pivotally mounted to bracket 107 and is moveable to engage a plurality of teeth 111 formed on housing 108. Thus, pawl 110 may be manually moved apart from teeth 111 to allow the axle 106 to move toward web 35 creating slack in web 35 whereas the axle 106 is prevented from moving toward web 35 when the pawl is engaged with the teeth. The retractor 31, manual rotatably mounted spool 100, or linear adjuster 101 each provide an adjuster for controlling the slack in the webs.

Figure 8:
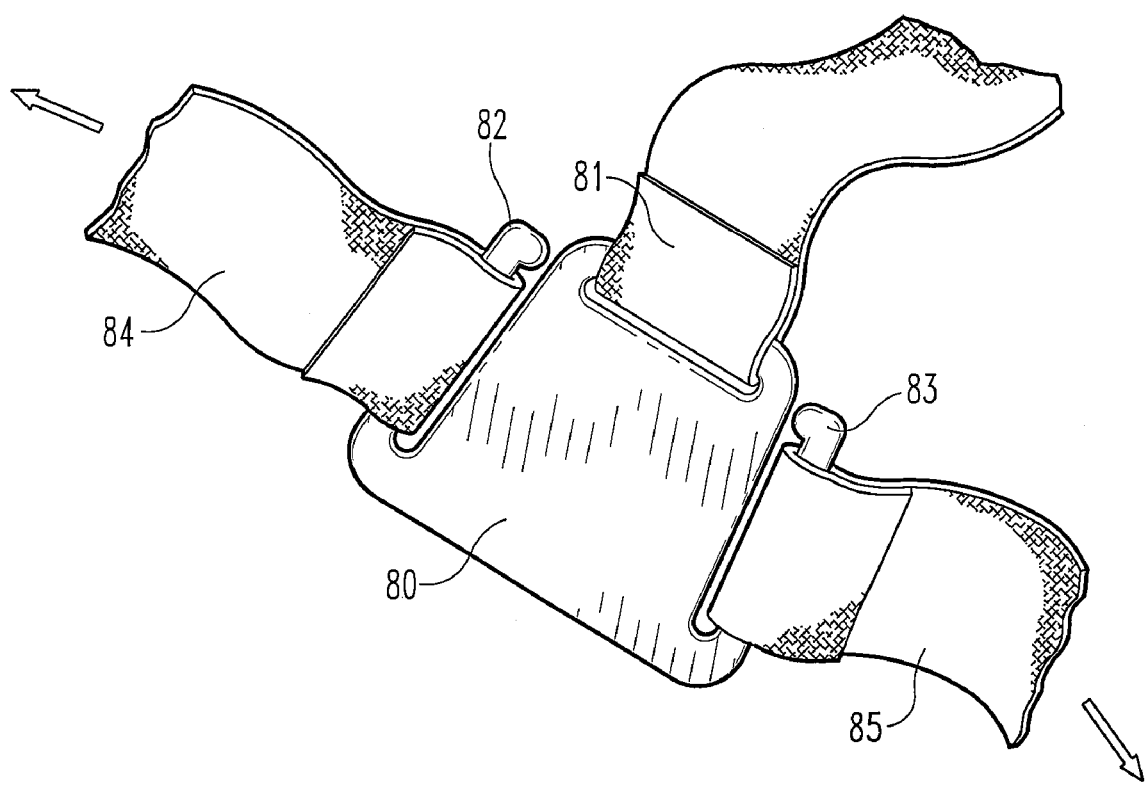
FIG. 8 is a fragmentary perspective view of a further alternate embodiment utilizing a plate with hooks to connect the webs shown in FIG. 3.
Figure 9:
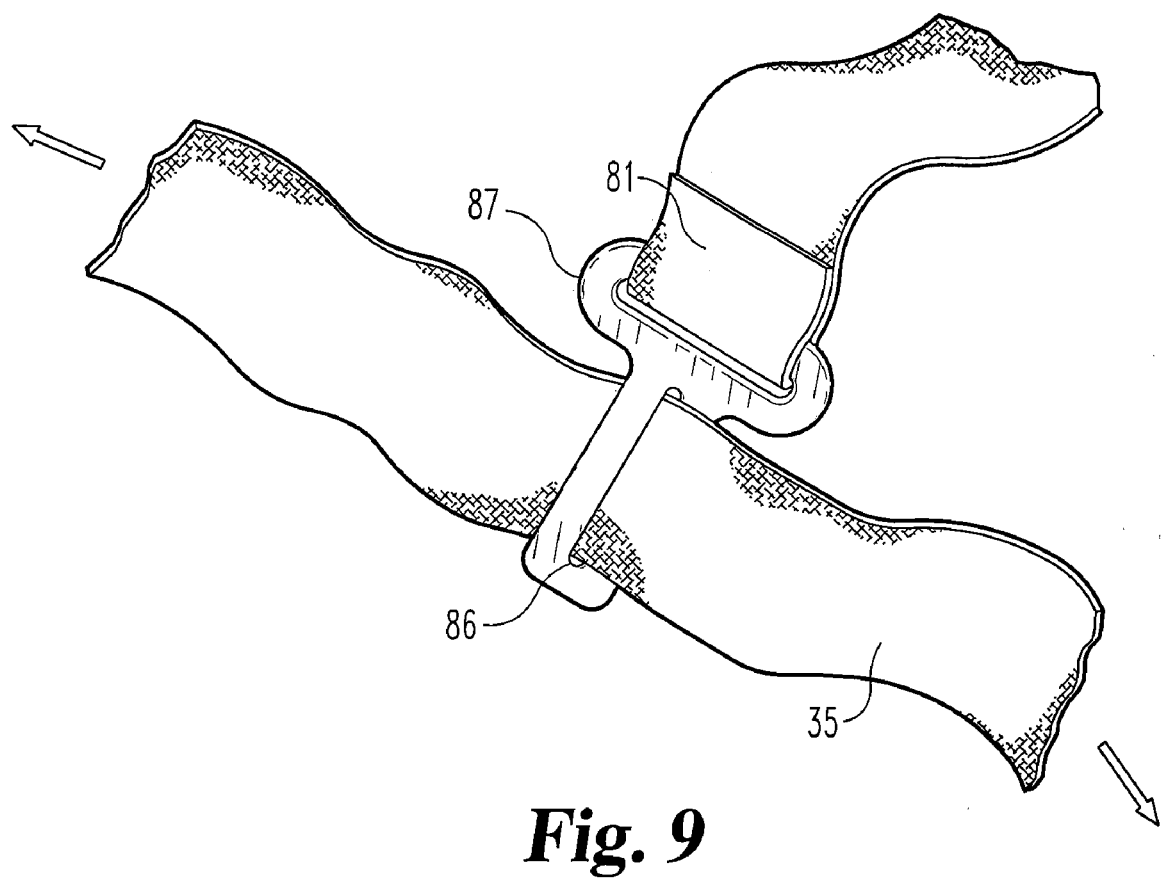
FIG. 9 is a fragmentary perspective view of a further alternate embodiment utilizing a plate with a slot to connect the webs shown in FIG. 3.

An alternate means for connecting web 32 or 51 to web 35 is through the use of a connecting plate 80 (FIG. 8). The outer distal end 81 of web 32 or 51 is connected to plate 80 which in turn has hooks 82 and 83 upon which webs 84 and 85 are connected with the opposite ends of webs 84 and 85 being connected to the connectors 38 and 39. Webs 84 and 85 are used in place of a single web 35. In the event a single web 35 is to be used in lieu of two webs 84 and 85, then web 35 may extend slidably through a slot 86 (FIG. 9) in plate 87 connected to web 32 or 51 instead of using hooks 82 and 83.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for securing a child seat to an anchor structure of a vehicle comprising:
    a first coupler lockingly and releasably engageable with an anchor structure of a vehicle;
    a second coupler lockingly and releasably engageable with said anchor structure;
    a first flexible elongated component having a first end and a second opposite end attached respectively to said first coupler and said second coupler;
    a locking mechanism mounted to a child seat, said locking mechanism having a second elongated member extendable therefrom, said second elongated member coupled to said first elongated component, said locking mechanism having said second elongated member extendable therefrom to provide slack in said first elongated component to allow said first coupler and said second coupler to be moved outwardly from said child seat to lockingly engage said anchor structure with said second elongated member tightenable to reduce said slack in said first elongated component securing said child seat to said anchor structure, said second elongated member has projections thereon limiting travel of said second elongated member; and,
    a pair of guide rods with said second elongated member extending slidingly therebetween being guided to said first elongated component with one of said rods contactable with said projections to limit travel of said second elongated member.

2. The apparatus of claim 1 wherein said first elongated component is a first elongated member.

3. The apparatus of claim 2 wherein:
    said second elongated member has a distal end with a loop formed thereon through which said first elongated member extends slidingly therethrough allowing relative motion between said first elongated member and said second elongated member.

4. The apparatus of claim 2 wherein:
    said second elongated member has a distal end fixedly attached to said first elongated member equidistant between said first end and said second end of said first elongated member limiting relative motion between said first elongated member and said second elongated member.

5. The apparatus of claim 2 wherein said first elongated member and said second elongated member are straps.

6. The apparatus of claim 1 wherein:
    said locking mechanism is an adjuster having said second elongated member connected thereto.

7. The apparatus of claim 6 wherein said adjuster is a retractor with a rotatable spool having said second elongated member wrapped thereon.

8. The apparatus of claim 6 wherein said adjuster is a linear adjuster with a slidably mounted spool spring biased away to tighten said first elongated component.

9. The apparatus of claim 1 wherein said first elongated component includes a pair of straps connected to said first coupler and said second coupler, and further comprising:
   a plate connecting said first elongated component to said pair of straps.

10. The apparatus of claim 1 wherein said first elongated component is a first elongated strap and further comprising a bracket attached to said second elongated member and having a slot through which said first elongated strap slidingly extends.

11. A child seat securable to anchor structure of a vehicle comprising:
   a child seat frame having a pair of rods mounted thereto and a pair of guides on opposites sides of said frame;
   a lower anchor flexible elongated component with a pair of opposite ends, each end extends through one of said guides;
   a pair of couplers mounted to said opposite ends and positioned on opposite sides of said child seat frame; and,
   a retractor mounted to said child seat frame and having a rotatably mounted spool with a strap extendable wrapped thereon, said strap is connected to said flexible component and when extended allows said couplers to move toward an anchor structure of a vehicle and when retracted reduces slack in said component tightening said child seat frame relative to anchor structure, wherein said pair of rods are arranged perpendicular to said strap to guide said strap toward said flexible component.

12. The child seat of claim 11 wherein:
   said strap has a looped shaped distal end through which said flexible component freely and slidably extends.

13. The child seat of claim 11 wherein:
   said strap has a distal end stitched to said flexible component.

14. The child seat of claim 13 wherein:
   said strap is perpendicularly arranged relative to said flexible component and is coupled thereto midway between said opposite ends of said flexible component.

15. A child seat with a single retractor lower anchor connection system for securing a child seat to a vehicle having an anchor structure comprising:
   a child seat with a shell and a frame with said shell mounted on said frame and having a pair of opposite side walls with strap openings;
   an automatic locking retractor with a rotatably mounted spool and a retractor strap spooled thereon, said retractor strap has a pair of projections thereon;
   a pair of connectors each with a mouth positionable onto an anchor structure in a vehicle;
   a lower anchor strap connected to said retractor strap, said anchor strap extending through said strap openings and extending outwardly of said opposite side walls where attached to said connectors, said retractor strap when extended allows said connectors to be pulled outwardly away from said child seat to connect to said anchor structure and when retracted tightening said retractor strap and said anchor strap securing the child seat to the anchor structure; and,
   a wall mounted to said frame, said wall defines a slot through which said retractor strap extends wherein said slot is located between said pair of projections to limit travel of said retractor strap.

16. The child seat of claim 15 wherein:
   said child seat may be oriented in a vehicle to face forwardly with said lower anchor strap extending rearward thereof.

17. The child seat of claim 16 wherein:
   said child seat may be oriented in a vehicle to face rearward with said lower anchor strap extending rearward.

18. The child seat of claim 16 wherein:
   said retractor is mounted beneath said shell with said retractor strap positioned midway between said side walls of said shell.

19. The child seat of claim 18 wherein:
   said retractor strap is perpendicularly arranged relative to said anchor strap.

20. A child seat securable to anchor structure of a vehicle comprising:
   a child seat having a frame with a seat portion and a back portion to support a child atop the child seat;
   a first strap with a proximal end and a distal end;
   a second strap with opposite ends and being slidably connected to said distal end of said first strap between said opposite ends;
   a pair of connectors mounted to said opposite ends and releasably lockable to an anchor structure of a vehicle for holding said child seat thereto;
   means mounted to said child seat and engaged with said first strap, said means having a first condition operable to release said first strap allowing said second strap to be pulled and said connectors moved outwardly from said child seat and engaged with said anchor structure of a vehicle, said means having a second condition operable to lock said first strap in a withdrawn position to hold said second strap tight thereby moving said connectors against said frame so said connectors with said second strap don't dangle from said child seat; and,
   wherein said engagement of said connectors to said anchor structure includes said second strap slidably moving relative to said first strap as said connectors are sequentially locked to said anchor structure.

21. The child seat of claim 20 wherein:
   said second strap is arranged generally normal to said first strap and is connected thereto generally midway between said opposite ends.

22. The child seat of claim 20 wherein:
   said means in said second condition operable to lock said first strap and said second strap tight thereby holding said child seat tight to said anchor structure.

* * * * *